(12) United States Patent
Bayer et al.

(10) Patent No.: US 10,131,045 B2
(45) Date of Patent: Nov. 20, 2018

(54) MODULAR FIXTURE AND SYSTEM FOR ROTOR-BOLT NUT REMOVAL

(71) Applicant: General Electric Company, Schenectady, NY (US)

(72) Inventors: David Christopher Bayer, Greenville, SC (US); John Earl Gordon, Jr., Spartanburg, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/478,269

(22) Filed: Apr. 4, 2017

(65) Prior Publication Data

US 2018/0281163 A1    Oct. 4, 2018

(51) Int. Cl.
| | |
|---|---|
| *B23Q 9/00* | (2006.01) |
| *B23B 47/28* | (2006.01) |
| *B23B 45/14* | (2006.01) |
| *B25B 27/18* | (2006.01) |
| *F01D 5/02* | (2006.01) |
| *B25H 1/00* | (2006.01) |

(52) U.S. Cl.
CPC ............ *B25B 27/18* (2013.01); *B23Q 9/0014* (2013.01); *B25H 1/0071* (2013.01); *F01D 5/025* (2013.01); *B23B 47/28* (2013.01); *B23B 47/284* (2013.01); *B23B 2215/76* (2013.01); *B23B 2247/12* (2013.01); *F05D 2230/70* (2013.01); *F05D 2240/60* (2013.01)

(58) Field of Classification Search
CPC .... B25B 27/18; B23Q 9/0014; B23Q 9/0021; B23B 47/28; B23B 47/281; B23B 47/282; B23B 47/284; B23B 45/14; B23B 2247/12; B23B 2215/76; B23B 2215/04
USPC ............................................ 248/188.4, 188.2
See application file for complete search history.

(56) References Cited

U.S. PATENT DOCUMENTS

| | | | | |
|---|---|---|---|---|
| 2,536,937 A | * | 1/1951 | Hosea | B23Q 1/522 108/104 |
| 2,898,785 A | * | 8/1959 | Quick | B23B 47/28 408/115 R |
| 2,996,936 A | * | 8/1961 | Blaise | B23B 47/28 408/115 R |

(Continued)

FOREIGN PATENT DOCUMENTS

| | | | | |
|---|---|---|---|---|
| JP | 2004-034713 A | * | 2/2004 | ............... B82D 1/14 |
| JP | 2005-161452 A | * | 6/2005 | ............. B23B 45/14 |

*Primary Examiner* — Ryan Rufo
(74) *Attorney, Agent, or Firm* — Charlotte C. Wilson; Ernest G. Cusick; Frank A. Landgraff

(57) ABSTRACT

The present disclosure is directed to a modular fixture for a rotor shaft assembly and a system for rotor-bolt nut removal. The modular fixture includes a plurality of arcuate plates that is annularly arranged about a common centerline. Each arcuate plate includes a plurality of jack legs that extends from and perpendicular to a bottom side surface of the respective arcuate plate of the plurality of arcuate plates. The system includes the modular fixture and a vertical drill. The vertical drill is connected to at least one arcuate plate of the plurality of arcuate plates. The vertical drill includes a vertically adjustable drive shaft and a bit that is connected to an end of the vertically adjustable drive shaft. In use, the bit cuts or turns a rotor-bolt nut or may core a rotor bolt of a rotor shaft assembly.

18 Claims, 6 Drawing Sheets

(56) References Cited

U.S. PATENT DOCUMENTS

| | | | | |
|---|---|---|---|---|
| 5,318,394 | A * | 6/1994 | Pierce | B23B 47/287 |
| | | | | 408/115 B |
| 8,402,925 | B2 | 3/2013 | Holmes et al. | |
| 8,979,442 | B2 | 3/2015 | Schacht et al. | |
| 9,259,793 | B2 | 2/2016 | Ihara et al. | |
| 9,273,611 | B2 | 3/2016 | Bird et al. | |
| 2002/0014573 | A1 * | 2/2002 | Anderson | F16M 7/00 |
| | | | | 248/677 |
| 2005/0084344 | A1 * | 4/2005 | Dods | B23B 47/287 |
| | | | | 408/67 |
| 2009/0261217 | A1 * | 10/2009 | Clark | B23Q 1/25 |
| | | | | 248/188.4 |
| 2010/0098507 | A1 * | 4/2010 | Binmore | B23B 47/28 |
| | | | | 408/1 R |
| 2015/0367424 | A1 * | 12/2015 | Obermeier | B23B 49/02 |
| | | | | 408/1 R |
| 2016/0305397 | A1 * | 10/2016 | Ohl, Jr. | F03D 1/003 |

* cited by examiner

MODULAR FIXTURE AND SYSTEM FOR ROTOR-BOLT NUT REMOVAL

FIELD

The subject matter disclosed herein relates to a rotor shaft assembly for a turbomachine. More particularly, the disclosure is directed to a modular fixture and a system for rotor-bolt nut removal from a rotor shaft assembly.

BACKGROUND

Turbomachines such as gas turbines, steam turbines and the like include at least one rotor shaft assembly. The rotor shaft assembly generally includes a forward wheel shaft, alternating rows of rotor wheels and spacer wheels and an aft wheel shaft which are tied or secured together via multiple tie-rods or rotor bolts. Rotor-bolt nuts are attached to opposing ends of each rotor bolt. The rotor-bolt nuts are torqued to provide a sufficient axial clamping force to maintain contact between each axially adjacent component. Over time, the rotor-bolt nuts and/or the rotor bolts may become seized or frozen in place.

BRIEF DESCRIPTION

Aspects and advantages are set forth below in the following description, or may be obvious from the description, or may be learned through practice.

One embodiment of the present disclosure is directed to a modular fixture for a rotor shaft assembly. The modular fixture includes a plurality of arcuate plates that is annularly arranged about a common centerline. Each arcuate plate includes a plurality of jack legs that extends from and perpendicular to a bottom side surface of the respective arcuate plate of the plurality of arcuate plates.

Another embodiment of the present disclosure is a rotor-bolt nut removal system. The system includes a plurality of arcuate plates and a vertical drill. The plurality of arcuate plates is annularly arranged about an axial centerline of a rotor shaft assembly and disposed along a top surface of a forward wheel shaft of the rotor shaft assembly. Each arcuate plate defines an opening that is aligned with a respective rotor bolt and a rotor-bolt nut of the rotor shaft assembly. The vertical drill is connected to at least one arcuate plate of the plurality of arcuate plates. The vertical drill includes a vertically adjustable drive shaft and a bit that connected to an end of the vertically adjustable drive shaft. The bit is engaged with the rotor-bolt nut.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Figure 1:
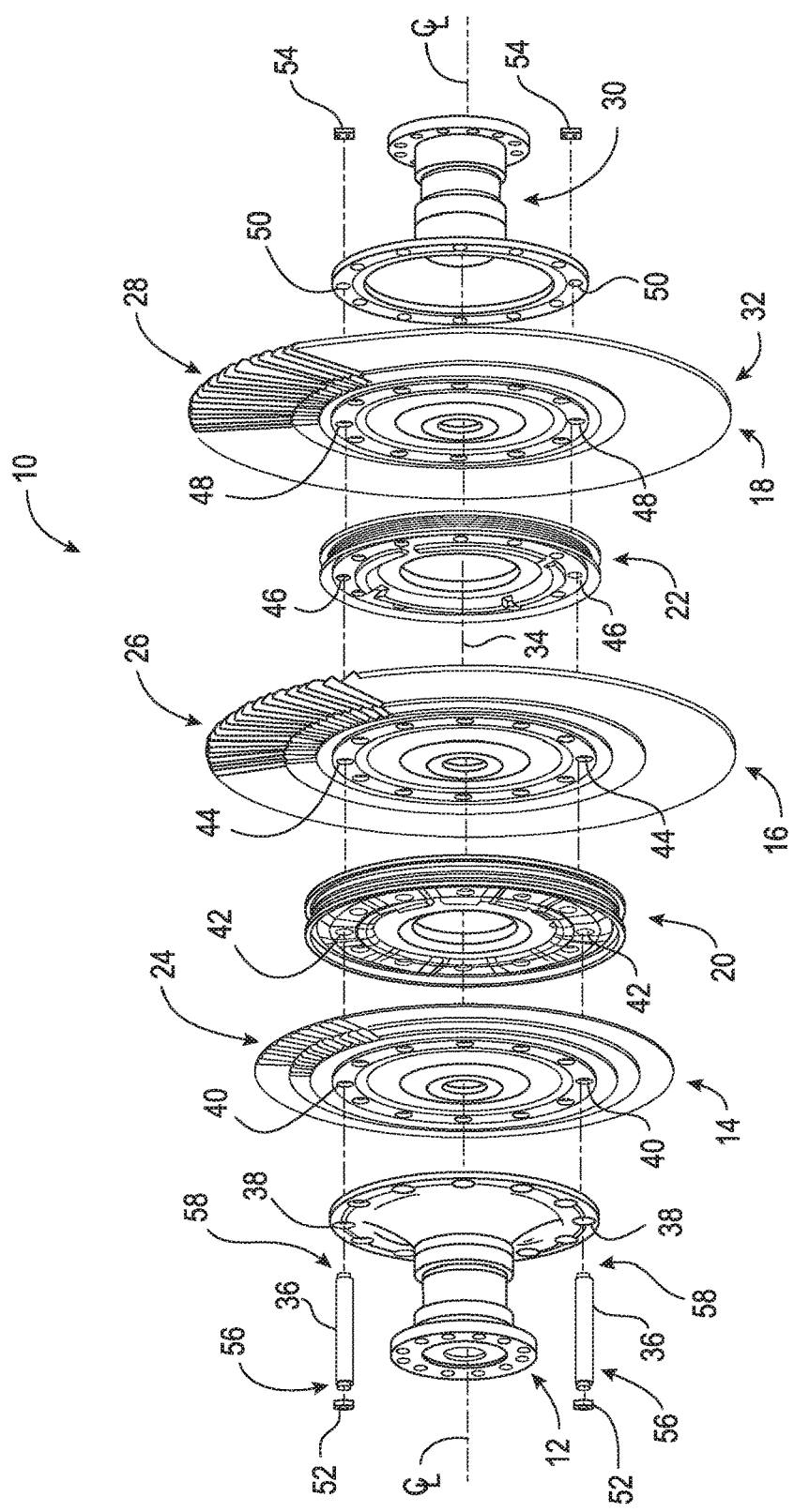
FIG. 1 is a schematic of an exemplary rotor wheel shaft assembly that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The term "radially" refers to the relative direction that is substantially perpendicular to an axial centerline of a particular component, and the term "axially" refers to the relative direction that is substantially parallel and/or coaxially aligned to an axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context rotor-bolt nut removal system for removing rotor-bolt nut from a rotor wheel shaft assembly of a gas turbine for purposes of illustration, one of ordinary skill in the art will readily appreciate that embodiments of the present disclosure may be applied to any style or type of rotor wheel shaft assembly such as a compressor and for any type of turbomachine such as steam turbine and are not limited to rotor wheel shaft assemblies for a turbine of a gas turbine unless specifically recited in the claims.

Referring now to the drawings, FIG. 1 illustrates a schematic diagram of an exemplary rotor wheel shaft assembly or shaft assembly 10 as may incorporate various embodiments of the present disclosure. As shown in FIG. 1, the shaft assembly 10 may include a forward wheel shaft 12 and a first rotor wheel 14 disposed axially adjacent to or against the forward wheel shaft 12.

In particular configurations, the shaft assembly 10 may comprise multiple rotor wheels. For example, as shown in FIG. 1 the shaft assembly 10 may further include a second rotor wheel 16 and a third rotor wheel 18. The rotor wheels 14 and 16 may be axially spaced from one another via spacer wheels 20 and 22 respectfully. Each respective rotor wheel 14, 16 and 18 may be formed to support a respective plurality of rotor blades 24, 26, 28 circumferentially spaced along an outer perimeter of the respective rotor wheel 14, 16 and 18. An aft wheel shaft 30 may be disposed axially adjacent to or against the third rotor wheel 18 or a last rotor wheel of multiple rotor wheels. The exact number of rotor wheels and/or spacer wheels is a choice of engineering design, and may be more or less than the three rotor wheels 14, 16, 18 illustrated in FIG. 1. A shaft assembly 10 with three rotor wheels and two spacer wheels is merely exemplary of one shaft assembly design and is not intended to limit the presently claimed system for removing a rotor-bolt nut from a shaft assembly in any manner.

In particular configurations, the shaft assembly 10 is held or tied together axially with respect to centerline 34 via a plurality of rotor bolts 36 that extend axially through respective coaxially aligned bolt holes 38, 40, 42, 44, 46, 48 and 50 defined by the forward wheel shaft 12, each of the rotor wheels 14, 16 and 18, the spacer wheels 20 and 22, and the aft wheel shaft 30 respectively. As shown in FIG. 1, rotor-bolt nuts 52, 54 are threaded onto opposing ends 56, 58 of the rotor bolt 36. The rotor-bolt nuts 38, 40 are torqued to provide a desired axial clamping or retention force to hold the shaft assembly 10 together. During operation of the turbine, the rotor-bolt nuts 52, 54 may become frozen, seized or stuck to the respective opposing end 56, 58 of the corresponding rotor bolt 36.

Figure 2:
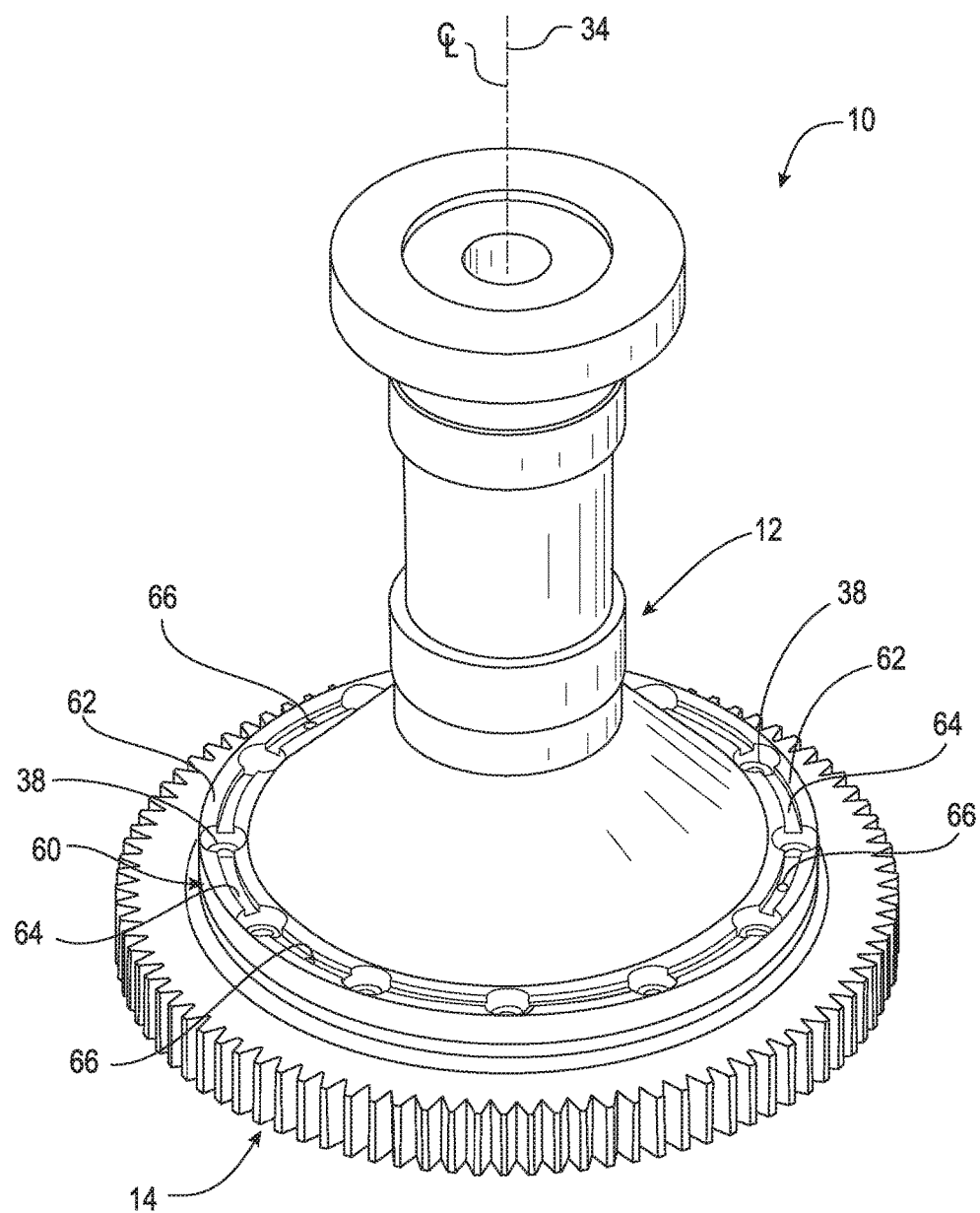
FIG. 2 is a perspective view of a portion of an exemplary rotor wheel shaft assembly including a forward wheel shaft connected to a first stage rotor wheel as may incorporate various embodiments of the present disclosure.

FIG. 2 provides a perspective top view of a portion of the shaft assembly 10 as shown in FIG. 1, including the forward wheel shaft 12 and the first rotor wheel 14. As shown in FIG. 2, the forward wheel shaft 12 includes a flange portion 60 having a forward surface 62. The forward surface 62 may be planar or substantially planar. The flange portion 60 defines bolt holes 38 which extend through the forward surface 62. The bolt hole 38 are circumferentially spaced across the flange portion 60 and are annularly arranged around centerline 34. In particular embodiments, the flange portion 60 further defines a balance weight groove or slot 64 that extends circumferentially between each of the bolt holes 38 along the forward surface 62. In particular embodiments, the flange portion 60 defines a plurality of threaded jacking holes 66 disposed within the slot 64. When installed, each rotor-bolt nut 52 (not shown) is seated or at least partially disposed within a corresponding bolt hole 38.

Figure 3:
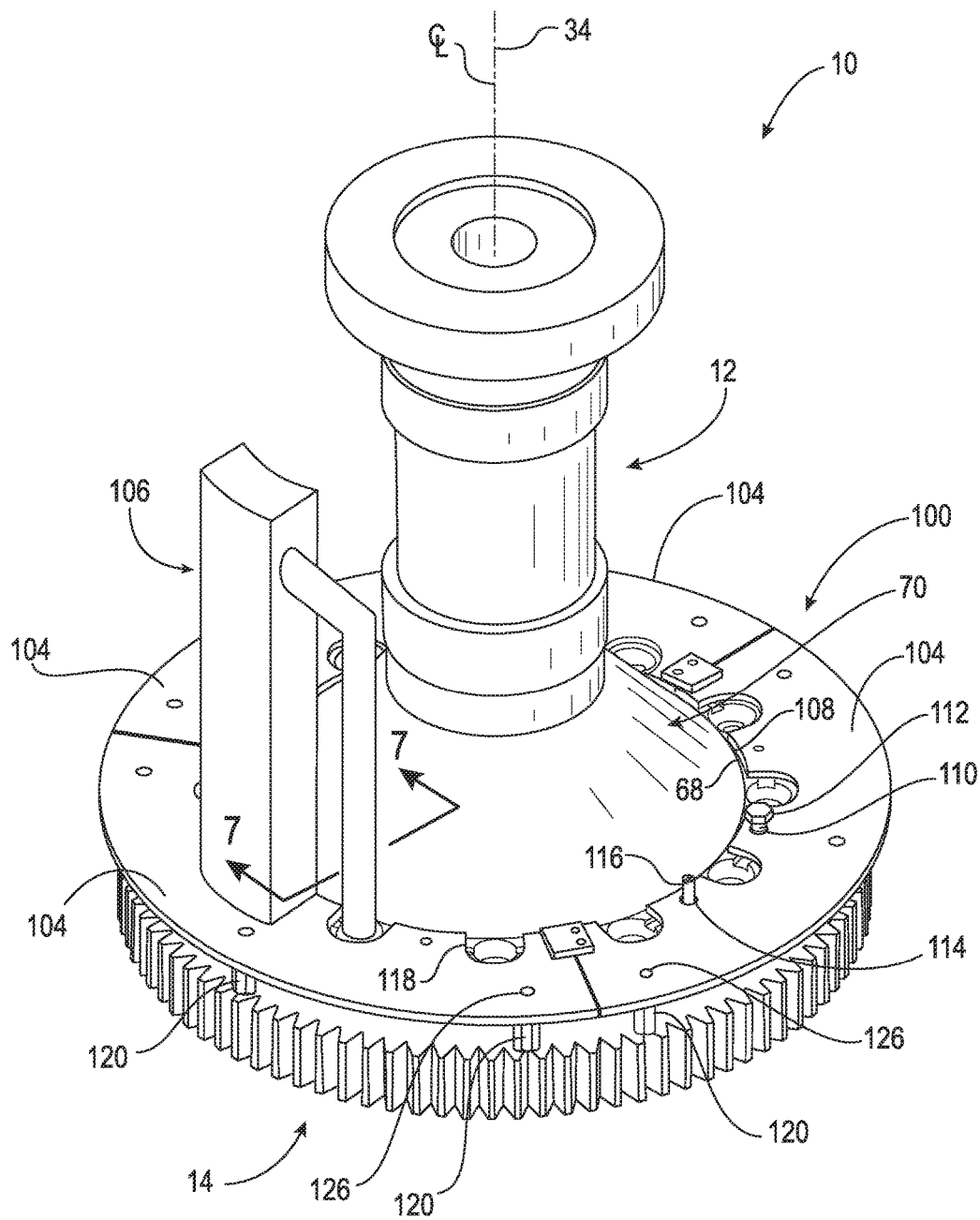
FIG. 3 is a perspective view of a portion of an exemplary rotor wheel shaft assembly including a forward wheel shaft connected to a first stage rotor wheel and a rotor-bolt nut removal system according to one or more embodiments of the present disclosure.
Figure 4:
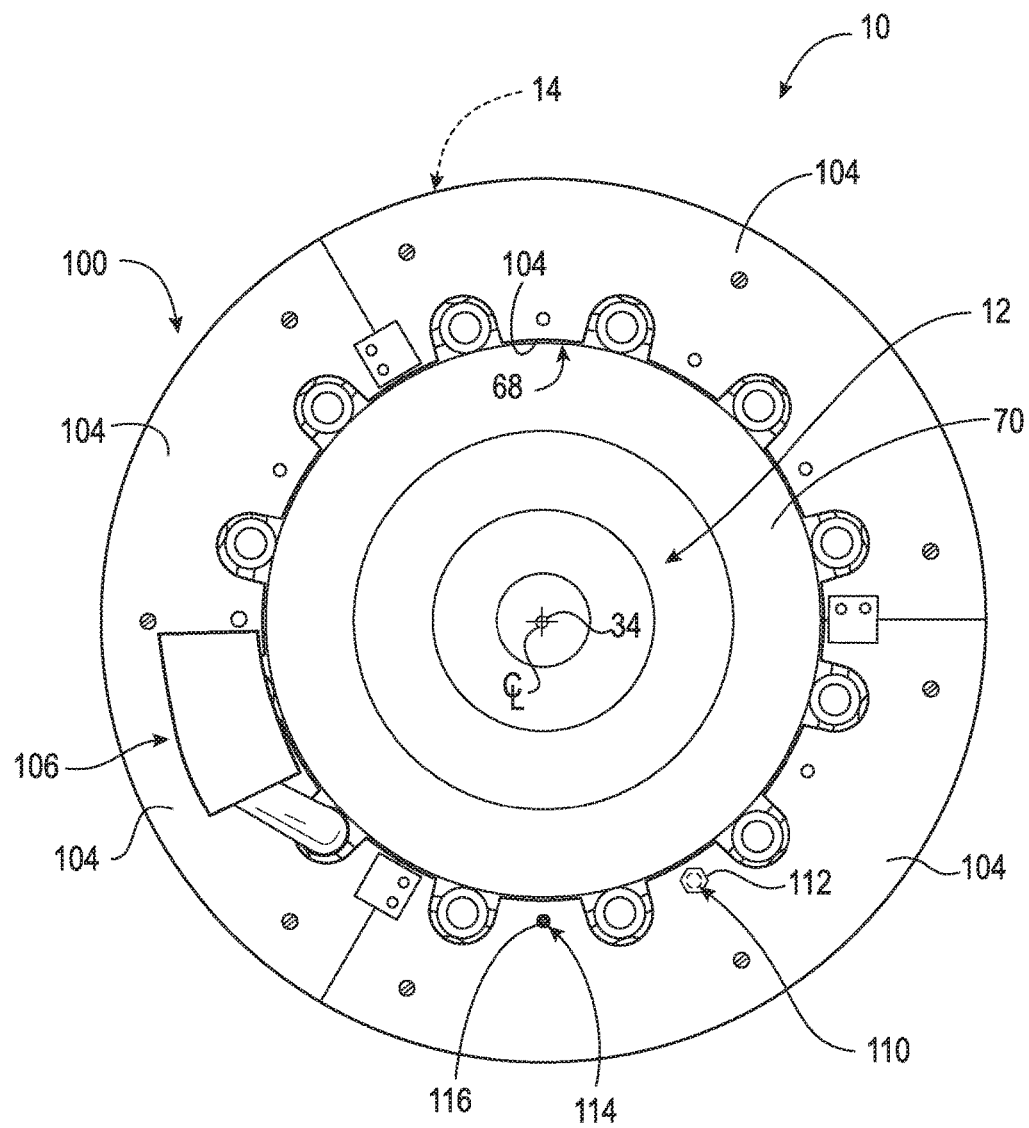
FIG. 4 is top view of the rotor wheel shaft assembly as shown in FIG. 3, according to at least one embodiment of the present disclosure.

FIG. 3 provides a perspective top view of a portion of the shaft assembly 10 as shown in FIGS. 1 and 2 collectively, including the forward wheel shaft 12, the first rotor wheel 14 and rotor-bolt nut removal system or system 100. FIG. 4 provides a top down view of the portion of the shaft assembly 10 as shown in FIG. 3 according to at least one embodiment of the present disclosure. In various embodiments, as shown in FIGS. 3 and 4 collectively, the system 100 includes a modular fixture 102. The modular fixture 102 includes a plurality of arcuate plates 104 annularly arranged about the axial centerline 34 of the shaft assembly 10. In particular embodiments, as shown in FIG. 3, the system 100 may include a vertical drill 106 or other cutting or torque generating component.

In at least one embodiment, as shown in FIGS. 3 and 4 collectively, an inner diameter 108 of each arcuate plate 104 is formed and/or dimensioned to fit around an outer diameter 68 of a bell flare portion 70 of the forward wheel shaft 12. In particular embodiments, as shown in FIGS. 3 and 4 collectively, each arcuate plate 104 defines at least one tie down bolt aperture 110. In use, a respective tie down bolt 112 may be inserted through a corresponding tie down bolt aperture 110 and extend into a corresponding threaded jacking hole 66 (FIG. 2) of the forward wheel shaft 12, thereby securing the respective arcuate plate 104 to the forward wheel shaft 12. As shown in FIGS. 3 and 4 collectively, at least one arcuate plate 104 defines at least one anti-rotation pin hole 114. In use, a pin 116 may extend through the anti-rotation pin hole 114 and into the slot 64 (FIG. 2), thereby preventing rotation of the corresponding arcuate plate 104 with respect to the centerline 34. In various embodiments, as shown in FIG. 4, each arcuate plate 104 defines a plurality of openings 118. Each opening 118 is formed to axially and circumferentially align with a respective rotor bolt 36 and/or rotor-bolt nut 52.

Figure 5:
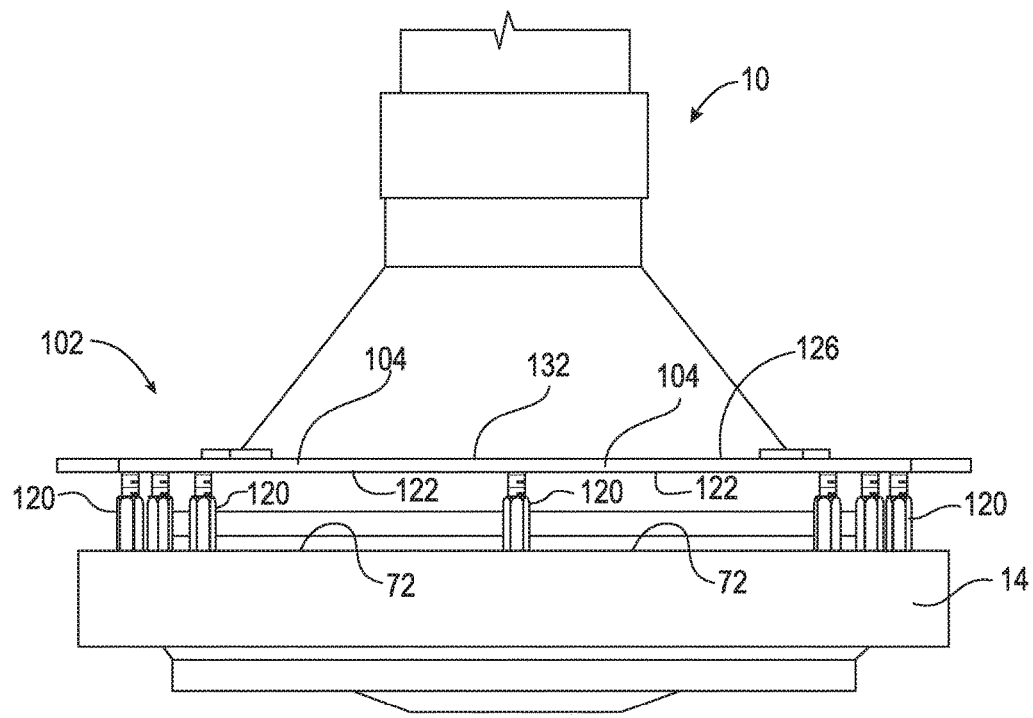
FIG. 5 is front view of a portion of the rotor wheel shaft assembly as shown in FIG. 3, according to at least one embodiment of the present disclosure.

FIG. 5 provides a side view of the portion of the shaft assembly 10 shown in FIG. 3 including the modular fixture 102 according to at least one embodiment. In various embodiments, as shown in FIG. 5, each arcuate plate 104 includes a plurality of jack legs 120. Each jack leg 120 extends from a bottom side surface 122 of the corresponding arcuate plate 104 to a top side surface 72 of the first rotor wheel 14. In particular embodiments, the jack legs 120 extend from and perpendicular to the bottom side surface 122 of the respective arcuate plate 104 of the plurality of arcuate plates 104.

Figure 6:
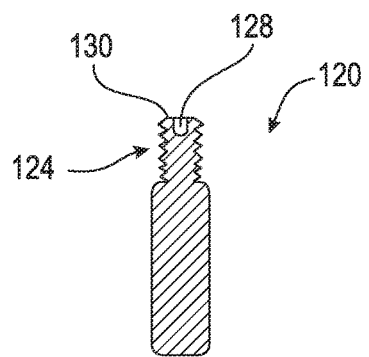
FIG. 6 is an enlarged cross-sectioned side view of a an exemplary jack leg, according to at least one embodiment of the present disclosure.

FIG. 6 provides an enlarged cross-sectioned side view of an exemplary jack leg 120 according to at least one embodiment of the present disclosure. As shown in FIG. 6, the jack leg 120 includes a threaded portion 124. The threaded portion 124 may be threadingly engaged with a corresponding jack leg hole 126 (FIG. 3) defined by the respective arcuate plate 104. In particular embodiments, as shown in FIG. 6, the jack leg 120 may include a slot or other feature 128 defined along a top surface or end 130 of the jack leg 120. In use, each jack leg 120 may be torqued or turned via a torque tool such as a ratchet, a screw driver or similar tool to vertically adjust (raise or lower) the respective arcuate plate 104, thereby leveling a top side surface 132 of the respective arcuate plate 104. For shipping and/or storage purposes, each of the jack legs 120 may be removed from the respective arcuate plates 104.

In particular embodiments, as shown in FIG. 4, the modular fixture 102 includes at least one tab 134. The tab(s) 134 extends circumferentially from a first arcuate plate 136 of the plurality of arcuate plates 104 to a second arcuate plate 138 of the plurality of arcuate plates 104 which is circumferentially adjacent to the first arcuate plate 136. The tab 134 may be fixedly connected (i.e., welding or singularly formed) and/or removably connected (via bolts or screws) to both the first arcuate plate 136 and the second arcuate plate 138. In use, the tab 134 links or fixedly connects the first arcuate plate 136 to the second arcuate plate 138.

Figure 7:
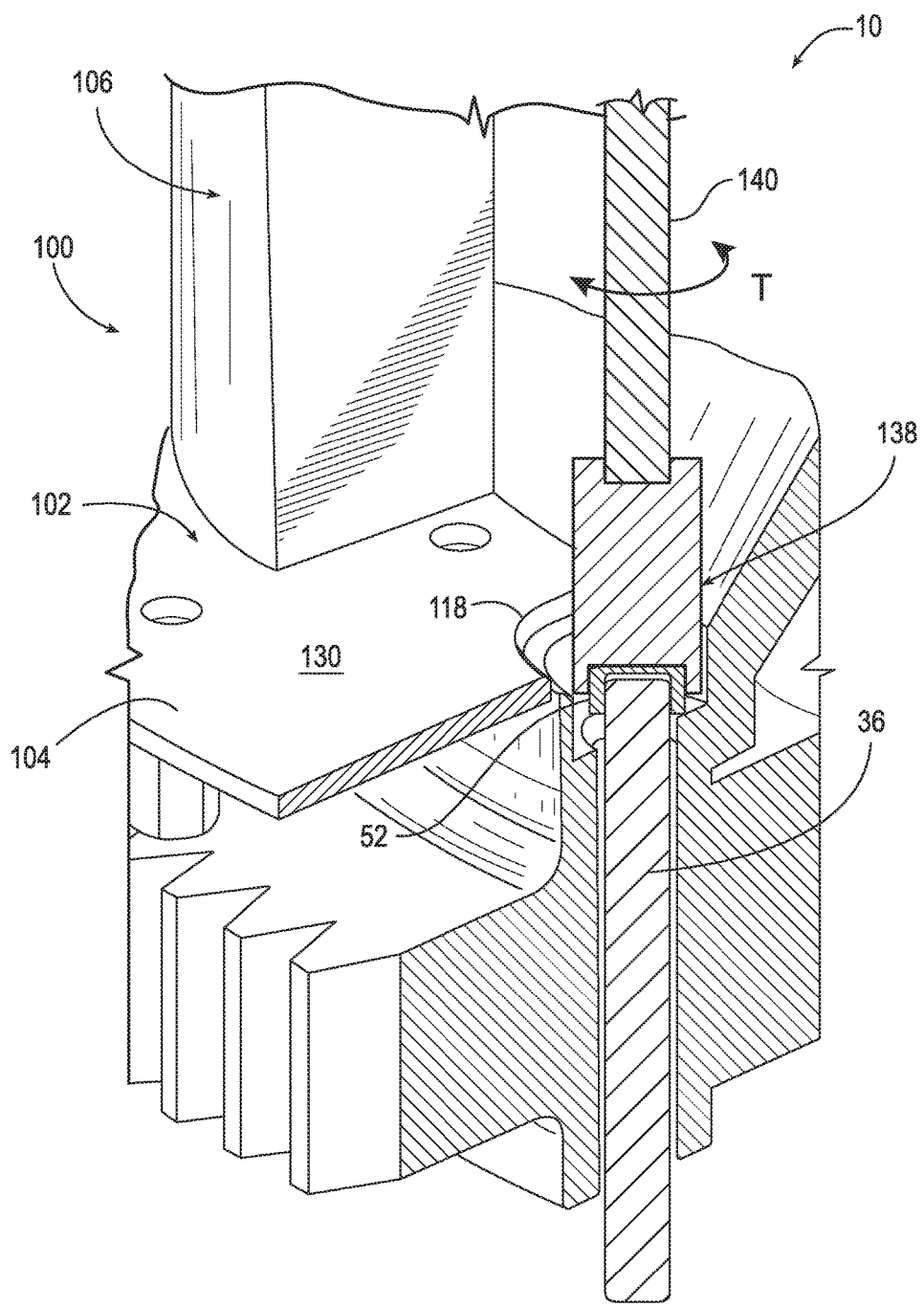
FIG. 7 is an enlarged cross-sectioned side view of a portion of the rotor wheel shaft assembly as taken along section lines 7-7 in FIG. 3, according to at least one embodiment of the present disclosure.

FIG. 7 provides a cross-sectioned perspective side view of a portion of the shaft assembly 10 with the modular fixture 102 and the vertical drill 106 attached to one or more of the arcuate plates 104 as taken along section line 7-7 in FIG. 3, according to at least one embodiment of the present disclosure. In use, as shown in FIG. 7, the vertical drill 106 may be connected to and/or seated on the top side surface 130 of one or more of the arcuate plates 104. In particular embodiments, the vertical drill 106 may comprise a universal magnetic base drill.

During operation of the system 100, as shown in FIG. 7, a bit 138 such as a hole saw or a spade bit may be connected to a vertically adjustable drive shaft 140 of the vertical drill 106. The bit 138 may be lowered vertically through a respective opening 118 of the plurality of openings 118 defined by a respective arcuate plate 104 of the plurality of arcuate plates 104. The bit 138 engages with the rotor-bolt nut 52 and/or the rotor bolt 36 as the bit 138 is lowered onto the rotor-bolt nut 52. In one embodiment, as torque is applied to the vertically adjustable drive shaft 140, the bit 138 cuts the rotor-bolt nut 52 from the respective rotor bolt 36 until the rotor-bolt nut 52 is removed or removable from the rotor bolt 36. In one embodiment wherein the bit 138 comprises a spade bit, the bit 138 will core the rotor bolt 36. In particular embodiments, the bit 138 may comprise a sinker EDM in which case the rotor-bolt nut 52 and/or the rotor bolt 36 may be burned away. In one embodiment, the bit 138 comprises a socket connected to the vertically adjustable drive shaft 140. As torque is applied to the vertically adjustable drive shaft 140, the bit 138 torques or turns the respective rotor-bolt nut 52 until the rotor-bolt nut 52 is removable or removed from the rotor bolt 36.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A modular fixture for a rotor shaft assembly, the modular fixture comprising:
a plurality of arcuate plates annularly arranged about a common center line, the common center line being an axial centerline of the rotor shaft assembly,
wherein the rotor shaft assembly comprises a forward wheel shaft and one or more rotor wheels disposed axially adjacent the forward wheel shaft, a plurality of rotor bolts disposed through coaxially aligned bolt holes defined through the forward wheel shaft and the one or more rotor wheels, and a plurality of rotor-bolt nuts threaded onto the plurality of rotor bolts;
wherein each arcuate plate of the plurality of arcuate plates is disposed along a top surface of a forward wheel shaft and defines an opening aligned with a respective rotor bolt of the plurality of rotor bolts and a respective rotor-bolt nut of the plurality of rotor-bolt nuts, each arcuate plate of the plurality of arcuate plates further including a plurality of jack legs extending from and perpendicular to a bottom side surface of the respective arcuate plate of the plurality of arcuate plates and extending to a top side surface of a first rotor wheel of the one or more rotor wheels.

2. The modular fixture as in claim 1, wherein a threaded portion of each jack leg of the plurality of jack legs is threadingly engaged with a respective jack leg hole defined by each respective arcuate plate of the plurality of arcuate plates.

3. The modular fixture as in claim 1, wherein each jack leg of the plurality of jack legs is vertically adjustable to level a respective top surface of the respective arcuate plate of the plurality of arcuate plates.

4. The modular fixture as in claim 1, further comprising a tab, wherein the tab connects a first arcuate plate of the plurality of arcuate plates to a second circumferentially adjacent arcuate plate of the plurality of arcuate plates.

5. The modular fixture as in claim 1, wherein at least one arcuate plate of the plurality of arcuate plates defines an anti-rotation pin hole, wherein a pin extends through the anti-rotation pin hole and into a balance weight slot of the forward wheel shaft of the rotor shaft assembly.

6. The modular fixture as in claim 1, wherein each arcuate plate of the plurality of arcuate plates defines at least one tie down bolt aperture.

7. The modular fixture as in claim 6, further comprising a plurality of tie down bolts, each tie down bolt of the plurality of tie down bolts extending through a respective tie down bolt aperture of the at least one tie down bolt aperture and into a respective threaded hole defined by the forward wheel shaft.

8. A rotor-bolt nut removal system comprising:
a plurality of arcuate plates, wherein the plurality of arcuate plates is annularly arranged about an axial centerline of a rotor shaft assembly and disposed along a top surface of a forward wheel shaft of the rotor shaft assembly, wherein each arcuate plate defines an opening aligned with a respective rotor bolt and a rotor-bolt nut and includes a plurality of lack legs that extend vertically from a respective bottom side surface of each arcuate plate of the plurality of arcuate plates to a top side surface of a first rotor wheel of the rotor shaft assembly; and
a vertical drill connected to at least one arcuate plate of the plurality of arcuate plates, the vertical drill including a vertically adjustable drive shaft and a bit connected to an end of the vertically adjustable drive shaft, wherein the bit is engaged with the rotor-bolt nut.

9. The rotor-bolt nut removal system as in claim 8, wherein a threaded portion of each jack leg of the plurality of jack legs is threadingly engaged with a respective jack leg hole defined by each respective arcuate plate of the plurality of arcuate plates.

10. The rotor-bolt nut removal system as in claim 8, wherein each jack leg of the plurality of jack legs is vertically adjustable to level a respective top surface of the respective arcuate plate of the plurality of arcuate plates.

11. The rotor-bolt nut removal system as in claim 8, further comprising a tab, wherein the tab connects a first arcuate plate of the plurality of arcuate plates to a second circumferentially adjacent arcuate plate of the plurality of arcuate plates.

12. The rotor-bolt nut removal system as in claim 8, wherein at least one arcuate plate of the plurality of arcuate plates defines an anti-rotation pin hole, wherein a pin extends through the anti-rotation pin hole and into a wheel balance slot of the forward wheel shaft.

13. The rotor-bolt nut removal system as in claim 8, wherein each arcuate plate of the plurality of arcuate plates defines at least one tie down bolt aperture.

14. The rotor-bolt nut removal system as in claim 13, further comprising a plurality of tie down bolts, each tie down bolt of the plurality of tie down bolts extending through a respective tie down bolt aperture of the at least one tie down bolt aperture and into a respective threaded hole defined by the forward wheel shaft.

15. The rotor-bolt nut removal system as in claim 8, wherein the bit comprises a hole saw bit.

16. The rotor-bolt nut removal system as in claim 8, wherein the bit comprises a socket.

17. The rotor-bolt nut removal system as in claim 8, wherein the drill comprises a universal magnetic base drill.

18. The rotor-bolt nut removal system as in claim 8, wherein the rotor shaft assembly is a turbine rotor shaft assembly.

\* \* \* \* \*